United States Patent [19]

McManus

[11] Patent Number: 4,612,851
[45] Date of Patent: Sep. 23, 1986

[54] COOKING UTENSIL

[76] Inventor: Bernard T. McManus, Suite 311, U.S. Federal Bldg., Lander, Wyo. 82520

[21] Appl. No.: 742,313

[22] Filed: Jun. 7, 1985

[51] Int. Cl.⁴ ............................................. A47J 43/18
[52] U.S. Cl. ................................. 99/419; 99/421 A; 99/441; 126/30; D7/106
[58] Field of Search ...................... 99/419, 421 R, 441, 99/421 A, 421 V, 448; 211/59.1, 125; 126/30; D7/106, 323

[56] References Cited

U.S. PATENT DOCUMENTS

| | | | |
|---|---|---|---|
| 70,984 | 11/1867 | Fisher | 99/419 |
| 363,519 | 5/1887 | Houston | 99/419 X |
| 1,190,152 | 7/1916 | Gross | 211/59.1 |
| 1,782,639 | 11/1930 | Van Allen | 99/421 R |
| 2,052,505 | 8/1936 | Vetrosky | 99/441 X |
| 2,183,938 | 12/1939 | Lewis | 99/419 X |
| 2,324,233 | 7/1943 | Parsons | 99/441 X |
| 2,649,852 | 8/1953 | McCandless | 99/441 X |
| 2,710,575 | 6/1955 | Overman | 99/441 |
| 3,955,487 | 5/1976 | Chetta | 99/441 X |
| 4,120,280 | 10/1978 | Iverson | 126/30 |
| 4,446,777 | 5/1984 | Grigorenko | 99/441 X |

Primary Examiner—Billy J. Wilhite
Attorney, Agent, or Firm—Andrew C. Hess

[57] ABSTRACT

A cooking utensil for the preparation of food items such as frankfurters or marshmallows over a heat source. The cooking utensil comprises an elongated body, a first base attached to one end of the body capable of supporting the body in a vertical position and supporting food items on the surface of the first base not attached to the body, a second base attached to the other end of the body capable of supporting the body in a vertical position and supporting food items on the surface of the second base not attached to the body, a plurality of food impaling pins attached to either the first or second base which are positioned substantially in the direction of the long axis of the body, and a handle means associated with the cooking utensil to enable the maneuvering and inversion of the cooking utensil. A means for suspending the cooking utensil over a heat source not having a grill may also be associated with the invention.

6 Claims, 5 Drawing Figures

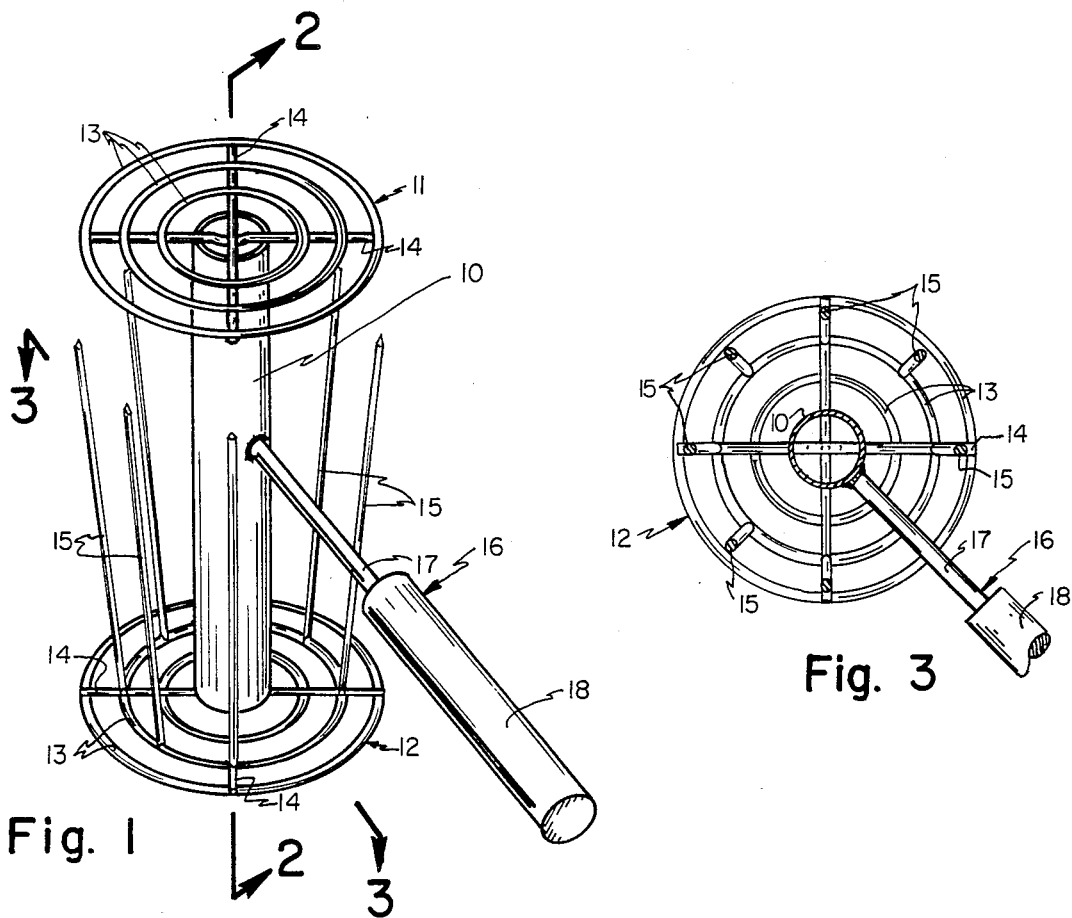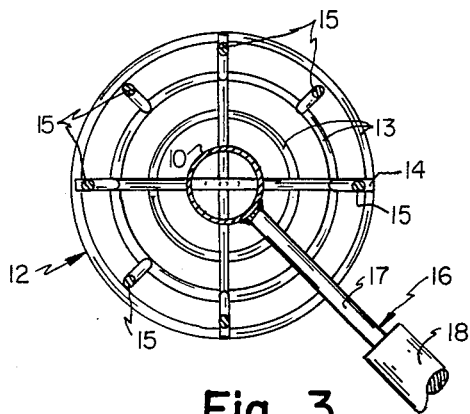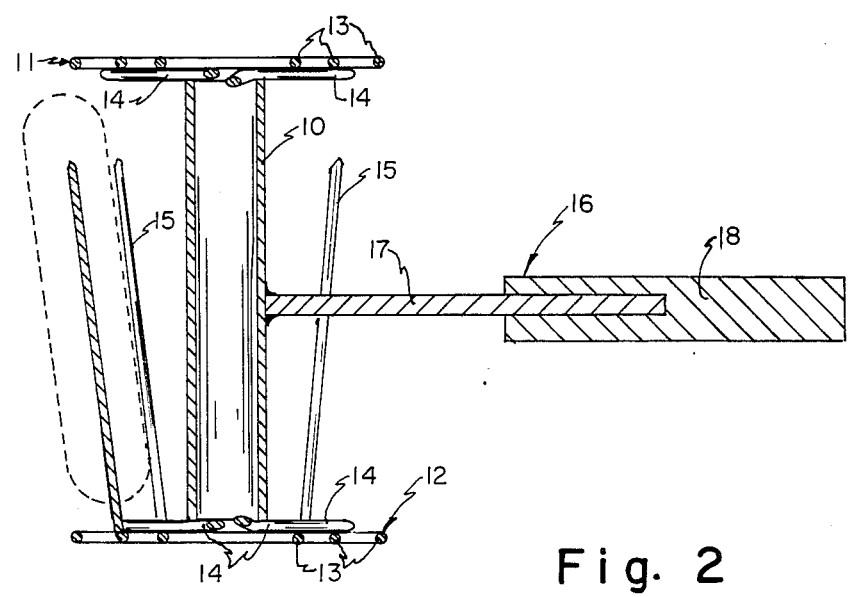

COOKING UTENSIL

BACKGROUND OF THE INVENTION

1. Field

The invention relates to cooking utensils used to cook food items over a heat source, particularly cooking utensils used to cook food items such as frankfurters, marshmallows and the like over a charcoal, gas fired or open fire grill.

2. State of the Art

In the past the cooking of frankfurters or similar food items over a charcoal, gas fired or open fire grill has been accomplished by placing the frankfurters directly on the grill. The cooking of frankfurters and marshmallows over an open fire has typically been accomplished by using a spit, typically a sharpened branch of a tree or a commercially-produced or hand-held barbecue spit. Prior art which discloses such devices include U.S. Pat. Nos. 4,446,777, issued May 8, 1984; 3,955,487, issued May 11, 1976; 2,324,233, issued July 13, 1943; 2,183,938, issued Dec. 19, 1939; and 1,782,639, issued Nov. 25, 1930.

Typically in the cooking of frankfurters over a grill, the frankfurters are placed directly on the grill surface thereby subjecting the frankfurters to scorching from the heat source, and taking up substantial room on the grill surface not enabling other food items to be cooked simultaneously with the frankfurters. Frankfurters cooked in this method have a tendency to roll off the grill onto the ground or into the heat source. Often times frankfurters cooked by prior methods cook on the outer surfaces much faster than internally and require a substantial amount of attention from the person cooking the frankfurter, particularly when a hand held spit is used as the cooking device. If heated rolls are also desired, prior cooking methods require the cooking of the frankfurters or food items first, then a reduction in temperature of the heat source to accommodate the heating of rolls.

SUMMARY OF THE INVENTION

Objectives

In the making of the invention, it was an objective to provide a cooking utensil particularly adapted to the cooking of frankfurters, marshmallows and like food items over a charcoal, gas fired or open fire grill that would cook the food items internally and externally at substantially the same time without scorching the external surfaces of the food items. A further objective of the invention was to provide a cooking utensil that would not take a substantial amount of room on the grill to allow the simultaneous preparation of other food items, such as steaks and hamburgers, which require direct contact with the grill surface for cooking. A further objective of the invention is to provide a self-supporting and invertible cooking utensil which would also accommodate the warming of other food items such as rolls. A final objective of the invention is to provide a cooking utensil which may be suspended over a heat source not having a grill upon which to rest the invention.

Features

In the accomplishment of the foregoing objectives of the invention, the cooking utensil comprises an elongated body, a first base attached to one end of the body capable of supporting the body in a vertical position and may also be capable of supporting food items on the surface of the first base not attached to the body; a second base attached to the other end of the body capable of supporting the body in a vertical position and may also be capable of supporting food items on the surface of the second base not attached to the body, a plurality of food impaling pins attached to either the first or second base which are positioned substantially in the direction of the long axis of the body, and a handle means associated with the cooking utensil to enable the maneuvering and inversion of the cooking utensil.

Preferably the body, first and second bases, pins and handle means are constructed of a metallic, heat conducting and ridged material such as stainless steel. The handle means is preferably partially wrapped with a heat insulating material, such as wood, insulating the parts to be touched to enable the maneuvering of the cooking utensil with the bare hand.

A means for suspending the cooking utensil over a heat source not having a grill may also be associated with the invention. Preferably the suspension means is a tripod with its apex over the center of the heat source from which the cooking utensil is hung with a chain and hook.

THE DRAWINGS

The best mode presently contemplated for carrying out the invention is shown in the accompanying drawings, in which:

FIG. 1 is a perspective view of the cooking utensil;

FIG. 2, a vertical section taken on line 2—2 of FIG. 1; and

FIG. 3, a horizontal section taken on line 3—3 of FIG. 1.

FIG. 4, a perspective view of another embodiment of the cooking utensil;

FIG. 5, a perspective view of the cooking utensil and a suspension means.

DETAILED DESCRIPTION OF THE ILLUSTRATED EMBODIMENT

Figure 4:
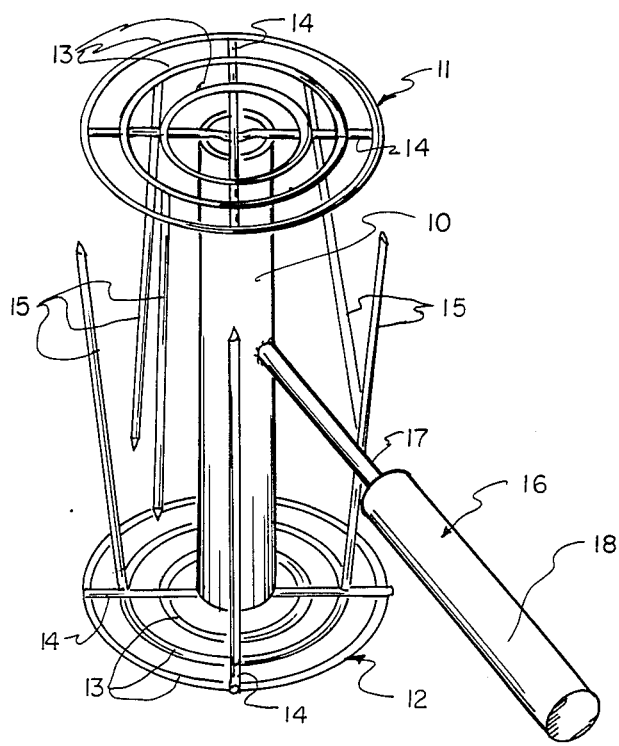

FIGS. 1, 2 and 3 illustrate a presently preferred embodiment of the cooking utensil according to the invention. The cooking utensil includes an elongated body (10) preferably tube shaped and constructed of a metallic material such as stainless steel. A first base (11) is connected to one end of the body and a second base (12) is connected to the other end of the body as indicated generally by the reference numerals. The bases are capable of supporting the body in a vertical position and of supporting food items on the surfaces of the bases not facing the body. The bases are preferably of like construction, made of a metallic material such as stainless steel and welded to the ends of the body.

The preferred construction of the bases is a series of concentric circles (13) of varying diameter constructed of stainless steel rodding. The circles are positioned one inside of the other and are planer. Preferably the circles are held in place with perpendicular stainless steel rods (14) which cross at the center of the circles and are no longer than the diameter of the largest circle. Preferably the circles are welded to the rods and the rods are welded to an end of the body.

Figure 5:
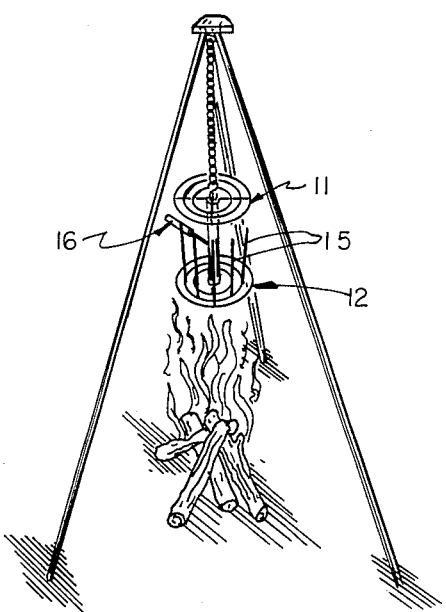

Food impaling pins (15) are attached to the bases and positioned such that the pins extend in a direction substantially parallel to the long axis of the body. Preferably the pins are stainless steel rods which are all welded to one of the central circles of either the first or the second base as illustrated in FIGS. 1, 2 and 3. The pins may also alternate between the bases as illustrated in FIG. 5.

A handle means (16) as indicated generally by the reference numeral is associated with the body, bases and pins for the inverting of the cooking utensil and maneuvering of the cooking utensil to and from a heat source. Preferably the handle means is a stainless steel rod (17) attached to the midpoint of the body, and has a heat insulating material (18) covering the end of the rod which is grasped by the hand. Preferably the heat insulating material is wood.

A suspension means may be associated with the cooking utensil to suspend the cooking utensil over a heat source. Preferably the suspension means is a tripod having its apex centered over the heat source. The cooking utensil is preferably hung from the apex of the tripod with an adjustable chain and at least one hook.

Whereas, this invention is here illustrated and described with specific reference to an embodiment thereof presently contemplated as the best mode of carrying out such invention in actual practice, it is to be understood that various changes may be made in adapting the invention to different embodiments without departing from the broader inventive concepts disclosed herein and comprehended by the claims that follow.

I claim:

1. A cooking utensil comprising:
   (a) an elongated body having opposite ends;
   (b) a first base attached to one end of the body being capable of supporting the body in a vertical position;
   (c) a second base attached to the other end of the body being capable of supporting the body in a vertical position;
   (d) a plurality of impaling pins, the ends of the pins being attached to either the first base or second base and being positioned substantially in the direction of the elongated axis of the body; and
   (e) a handle means associated with the body, bases and pins for maneuvering and inverting the cooking utensil.

2. A cooking utensil comprising:
   (a) an elongated body constructed of a tubular, rigid and metallic material;
   (b) a first base attached to one end of the body being capable of supporting the body in a vertical position and supporting food items on the surface of the first base not facing the body, and the first base being constructed of a metallic material;
   (c) a second base attached to the other end of the body being capable of supporting the body in a vertical position and supporting food items on the surface of the second base not facing the body, and the second base being constructed of a metallic material;
   (d) a plurality of impaling pins, the ends of the pins being attached to either the first base or second base and being positioned substantially in the direction of the elongated axis of the body, the pins being constructed of a metallic material; and
   (e) a handle means associated with the body, bases and pins for maneuvering and inverting the cooking utensil.

3. A cooking utensil as recited in claim 2, wherein:
   (a) the body is constructed of tubular stainless steel;
   (b) the first base is constructed of stainless steel;
   (c) the second base is constructed of stainless steel;
   (d) the impalling pins are constructed of stainless steel; and
   (e) the handle means is constructed of stainless steel wrapped with a heat insulating material on the portions to be touched by the hand.

4. A cooking utensil as recited in claim 2 further comprising a suspension means for suspending the cooking utensil above a heat source.

5. A cooking utensil comprising:
   (a) an elongated, tubular, stainless steel body;
   (b) a first base attached to one end of the body constructed of concentric circles of varying diameter of stainless steel rodding, the largest circle being of sufficient size to support the body in a vertical position, the circles being positioned one inside the other and planer and being held in place with perpendicular stainless steel rods which cross at the center of the circles, the rods being no longer than the diameter of the largest circle, and the rods being welded to the circles and to one end of the body;
   (c) a second base attached to the other end of the body constructed of concentric circles of varying diameter of stainless steel rodding, the largest circle being of sufficient size to support the body in a vertical position, the circles being positioned one inside the other and planer and being held in place with perpendicular stainless steel rods which cross at the center of the circles, the rods being no longer than the diameter of the largest circle, and the rods being welded to the circles and to the other end of the body;
   (d) a plurality of stainless steel impaling pins welded to one of the central circles of the first base, the pins being positioned substantially in the direction of the long axis of the body; and
   (e) a stainless steel rod of sufficient length to form a handle, the handle being attached perpendicular to the midpoint of the body and having a distal end of the handle being coated with a heat insulating material.

6. A cooking utensil as recited in claim 5 further comprising a suspension means for adjustably suspending the cooking utensil above a heat source.

* * * * *